United States Patent
Nakagawa et al.

(10) Patent No.: US 6,237,287 B1
(45) Date of Patent: *May 29, 2001

(54) WEATHERSTRIP ASSEMBLY

(75) Inventors: Hayami Nakagawa; Koji Takeshita, both of Anjo; Susumu Nishimoto, Okazaki, all of (JP)

(73) Assignee: Mitsubishi Jidosha Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,559

(22) Filed: Jul. 16, 1997

(30) Foreign Application Priority Data

Jul. 18, 1996 (JP) .................................... 8-189217

(51) Int. Cl.[7] ...................................................... E06B 7/16
(52) U.S. Cl. .............................................................. 49/479.1
(58) Field of Search ............................ 49/475.1, 479.1, 49/493.1, 440, 441

(56) References Cited

U.S. PATENT DOCUMENTS

| | | | |
|---|---|---|---|
| 4,010,573 | * 3/1977 | Andrzejewski | 49/479.1 |
| 4,888,917 | * 12/1989 | Mesnel et al. | 49/479.1 |
| 4,910,918 | * 3/1990 | Naples et al. | 49/479.1 X |
| 4,945,681 | 8/1990 | Nozaki et al. | |
| 5,463,832 | * 11/1995 | Eckart | 49/479.1 |

FOREIGN PATENT DOCUMENTS

| | | | |
|---|---|---|---|
| 3915900C2 | 5/1988 | (DE) . | |
| 2106974 | * 4/1983 | (GB) | 49/479.1 |
| 2152988 | * 8/1985 | (GB) | 49/479.1 |
| 2184767 | * 7/1987 | (GB) | 49/479.1 |
| 8111 | * 1/1985 | (JP) | 49/479.1 |
| 4-119714 | 10/1992 | (JP) . | |
| 6-039538 | 5/1994 | (JP) . | |

* cited by examiner

*Primary Examiner*—Jerry Redman (57) ABSTRACT

A weatherstrip assembly mounted to a body component or a body aperture through a holder includes a weatherstrip having weatherstrip bodies. Each pair of the weatherstrip bodies cooperate to form an L-shaped or a V-shaped corner portion of the weatherstrip corresponding to an associated one of L-shaped or V-shaped corner portions of the holder. Each of two weatherstrip bodies which constitute one of the corner portions of the weatherstrip has a mounting base held between a retainer and a clip which are respectively fixed to the inner and outer faces of the mounting base and which are coupled to each other through coupling pins formed integrally with the clip and extending through the weatherstrip mounting base, each coupling pin having a distal end portion thereof press-fitted into a pin hole formed in the retainer. By engaging respective clips of the weatherstrip assembly with the holder, the weatherstrip can be efficiently mounted through the holder to the body component or the body aperture, and a deviation of the mounted weatherstrip relative to the holder can be prevented.

12 Claims, 6 Drawing Sheets

WEATHERSTRIP ASSEMBLY

BACKGROUND OF THE INVENTION

1. Technical Field

The present invention relates to a weatherstrip disposed between a movable body component and an aperture formed in a body of an automobile, and more particularly, to a weatherstrip assembly for preventing a displacement of a weatherstrip in its installation position relative to the body aperture or the body component and for improving the efficiency of weatherstrip installation.

2. Related Art

Movable body components such as a door, a hood, a trunk lid are mounted on the body of an automobile. In this connection, the body is formed with apertures corresponding to such body components. A weatherstrip is mounted about the body aperture or the body component to prevent wind, rain, water, dust or the like from getting into the interior of the body by way of the clearances between the body aperture and the associated body component, reduce a shock impact at the time of opening and closing the body components, and prevent vibration of the body components during the running of the automobile.

Figure 1:
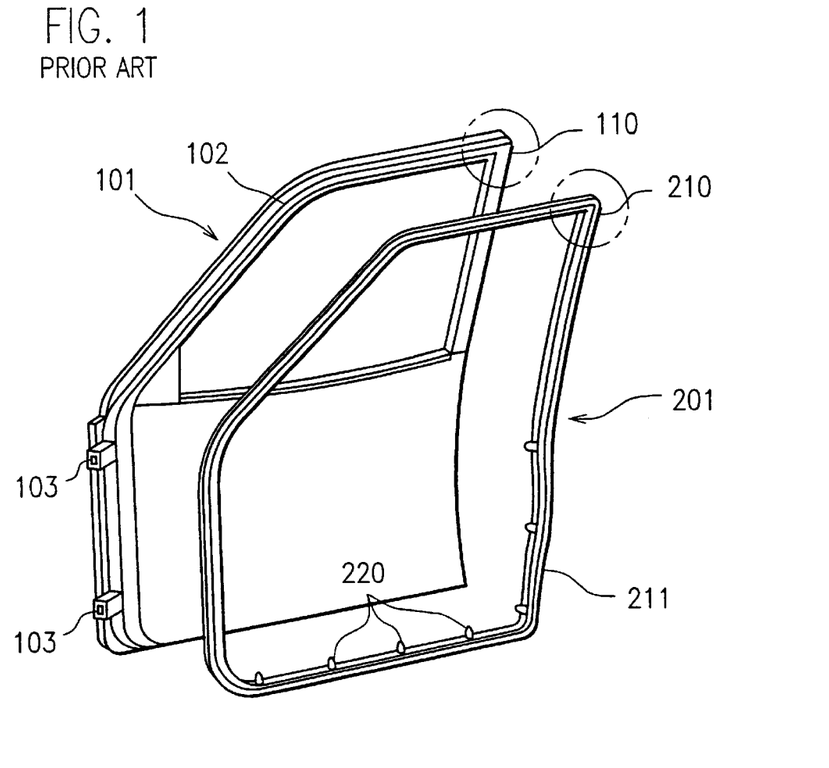
FIG. 1 is a schematic perspective view showing a conventional door weatherstrip, together with a door on which the weatherstrip is mounted.

For example, a door weatherstrip is attached to the periphery of a door of an automobile. The door has an installation seat adapted to be fixed to a weatherstrip holding portion 102 formed in door 101 and has a sealing lip formed integrally with the installation seat, as shown in FIG. 1. Typically, the door 101 is supported through hinges 103 by the body for rotation about the vertical axis passing through the hinges. Upon closure of the door 101, a force exerted toward the rear side of the door is applied, as shown by an arrow F in FIG. 2, to a corner portion 210 of a weatherstrip 201 which corresponds to a corner portion 110 of the door 101. A lip 203 formed in the weatherstrip corner portion 210 may therefore be displaced from its original installation position, as shown by a two-dotted chain line in FIG. 2, after years of use during which the door 101 is repeatedly opened and closed. This causes a degraded external appearance and a degraded sealing ability of the weatherstrip.

To obviate these problems, the weatherstrip 201 is generally fixed to the door 101 by inserting clips 220 (FIG. 1) formed integrally with the door weatherstrip 201 into clip holes, not shown, formed in the weatherstrip holding portion 102 of the door 101, or by adhering the weatherstrip 201 to the weatherstrip holding portion 102 with an adhesive or an adhesive tape. However, these weatherstrip mounting methods are disadvantageous because more man-hours are needed to mount the weatherstrip to the door during manufacture.

Figure 2:
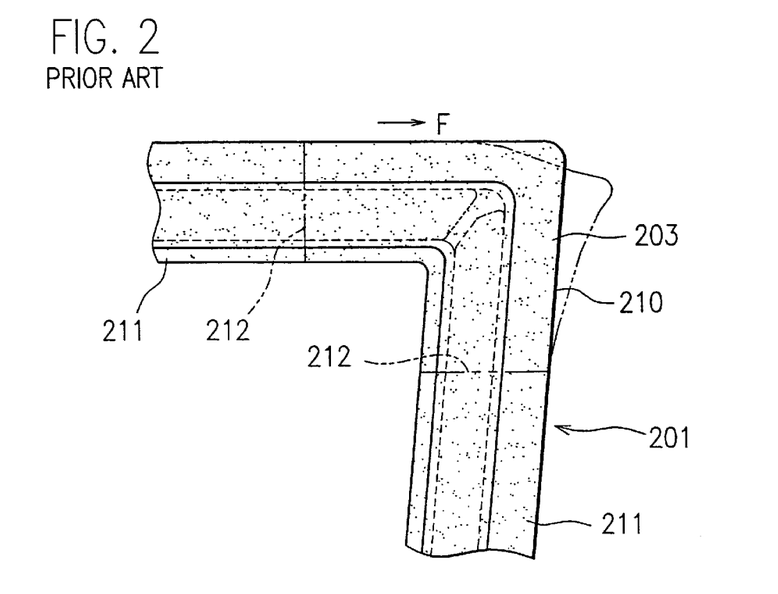
FIG. 2 is a fragmentary view showing the conventional weatherstrip in which a corner-molded portion and an extrusion-molding portion are integrally molded with each other, so as to reduce deviation of the weatherstrip from its its installation position as caused by opening and closing the door.

Under these circumstances, a weatherstrip is proposed in Japanese Provisional Utility Model Publication No. 4-119714, which has a main portion thereof provided with a sealing lip and an installation seat thereof adapted to be fixed to the weatherstrip holding portion of a door. As shown in FIG. 2, this weatherstrip 201 includes a corner-molded portion 210 mounted to a corner portion 110 of the door and an extrusion-molded portion 211 mounted to a portions of the door other than at corner 110.

By means of injection vulcanization molding, the installation seat, made of non-foamable solid rubber, and the main portion, made of sponge rubber, of the corner-molded portion 210 are formed integrally with the extrusion-molded portion 211. In FIG. 2, reference numeral 212 designates a coupled portion between the corner-molded portion 210 and the extrusion-molded portion 211.

In the weatherstrip 201, the installation seat of the corner-molded portion 210 is made of non-foamable solid rubber, to thereby provide the installation seat with a suitable rigidity. This permits the corner-molded portion 210 to sufficiently withstand force applied thereto at the time of door closure, so that deviation of the corner-molded portion from an original installation position relative to the corner portion 110 of the door is prevented. The suitably rigid installation seat can also improve the manufacturing efficiency of attaching the weatherstrip 201 to the corner portion 110. Further, the weatherstrip 201 has its portions made of sponge rubber, other than the installation seat of the corner-molded portion 210, so that a sufficient sealing property of the weatherstrip is secured.

However, further improvement has been demanded in preventing weatherstrip displacement caused by repetitive opening and closing actions of a body component and in manufacturing efficiency of the installation of the weatherstrip to a body aperture or a body component.

In addition, a worker sometimes applies a large pulling force to a weatherstrip while attaching the weatherstrip to a body aperture or a body component such as a door. In this case, a corner portion of the weatherstrip can be deviated from its original installation position relative to a door sash toward either the front side or the rear side of the door sash, as shown in FIG. 2, depending on the direction in which the pulling force is applied.

To solve such a problem, a weatherstrip proposed in Japanese Provisional Utility Model Publication No. 6-39538 is comprised of a basic portion, a hollow seal portion, and a lip. The basic portion is fitted into an engaging recess formed in a holding portion of a door sash. The seal portion and the lip are formed integrally with the basic portion. Further, an insert metal formed with clip holes is embedded in a corner portion of the weatherstrip. By inserting clips into the clip holes, the insert metal is fixed to the door sash, to thereby prevent deviation or slippage of the weatherstrip relative to the door sash.

However, it is difficult for a worker to insert the clips into the clip holes of the insert metal. Accordingly, the efficiency in installing the weatherstrip on the door sash is low. Further, the rubber weatherstrip can easily be deformed, and hence the insert metal is sometimes moved in the weatherstrip as a result of repetitive opening and closing of the door. Thus, deviation of the weatherstrip from its original installation position is still possible. This necessitates reattachment of the weatherstrip. Further, if the insert metal is greatly moved so that the weatherstrip is damaged, complete replacement of the damaged weatherstrip with a new weatherstrip is required. In such cases, it is necessary to detach the clips from the clip holes. The reattachment and replacement of the weatherstrip, including detaching and inserting the clips from and into the clip holes, disadvantageously takes a lot of time and labor.

SUMMARY OF THE INVENTION

An object of the present invention is to provide a weatherstrip assembly capable of positively preventing deviation of a weatherstrip from an original installation position relative to a body component or a body aperture corresponding to the body component and capable of improving the efficiency of weatherstrip installation.

According to the present invention, a weatherstrip assembly is provided which is adapted to be mounted to a body component or a body aperture by way of a holder having a first holder portion and a second holder portion thereof extending at an angle from the first holder portion.

The weatherstrip assembly of the present invention comprises a weatherstrip having first and second weatherstrip bodies which have first and second mounting bases, respectively. These mounting bases are adapted to be supported by the first and second holder portions, respectively. The weatherstrip assembly further comprises first weatherstrip holding section which is fixed to the first mounting base of the first weatherstrip body and which is adapted to be engaged with the first holder portion.

The weatherstrip assembly of the present invention is advantageous in that, when the first weatherstrip holding section is engaged with the first holder portion of the holder formed in the body component or the body aperture, the first mounting base of the first weatherstrip body is mounted to the first holder portion by way of the first weatherstrip holding section, so that the weatherstrip can be reliably mounted on the holder. This makes it possible to prevent deviation of the weatherstrip relative to the holder which would be otherwise caused by repeated opening and closing of the body component. In installing the weatherstrip, it is sufficient for a worker to grip the weatherstrip and simply engage the first weatherstrip holding section, fixed to the first mounting base of the first weatherstrip body, with the first holder portion. Accordingly, weatherstrip installation work can be performed efficiently. Further, the worker is provided with a positive tactile response when the first weatherstrip holding section is engaged with the first holder portion. Accordingly, the worker can confirm whether the weatherstrip has been completely attached to the holder. Further, the weatherstrip can be detached from the body component or the body aperture by simply releasing the engagement between the first weatherstrip holding section and the first holder portion. Thus, the weatherstrip assembly of the present invention has excellent workability when dismounting the weatherstrip from the holder for weatherstrip reattachment or replacement.

Preferably, the weatherstrip assembly further comprises second weatherstrip holding section which is fixed to the second mounting base of the second weatherstrip body and which is adapted to be engaged with the second holder portion.

The above-mentioned preferred arrangement is advantageous in that, when the first and second weatherstrip holding sections are engaged with the first and second holder respectively, portions of the holder, the mounting bases of the first and second weatherstrip bodies are mounted to the first and second holder portions by way of the first and second weatherstrip holding sections, respectively. This permits both sides (the first and second weatherstrip bodies) of a corner portion of the weatherstrip to be reliably mounted to the both sides (the first and second holder portions) of a corner portion of the holder.

Preferably, the first and second holder portions of the holder form therebetween a predetermined angle that is close to 90 degrees. The first weatherstrip body and the second weatherstrip body form therebetween an angle close to the predetermined angle, and the first weatherstrip holding section and the second weatherstrip holding section also form an angle therebetween close to the predetermined angle.

With this arrangement, it is possible to provide a weatherstrip assembly suitably mounted on a body component or a body aperture having a squared corner portion, such as a upper corner of a door of an automobile.

Preferably, each from a the first and second weatherstrip holding sections is made of hard resin.

With this arrangement, to the first and second weatherstrip holding sections each having a suitable degree of rigidity. Accordingly, deviation of the weatherstrip from its installation position can be more reliably prevented and the efficiency of weatherstrip installation can be further improved. Moreover, the first and second weatherstrip holding sections can be precisely manufactured at low cost by means of a molding technique using hard resin as a molding material.

Preferably, the first weatherstrip holding section has a first base member thereof fixed to the first mounting base of the first weatherstrip body, and a first engaging portion thereof adapted to be engaged with the first holder portion of the holder. The second weatherstrip holding section has a second base member thereof fixed to the second mounting base of the second weatherstrip body, and a second engaging portion thereof adapted to be engaged with the second holder portion of the holder. The first and second base members are formed integrally with each other and form therebetween substantially the same angle as the angle formed between the first and second holder portions of the holder.

With this arrangement, both sides (the first and second weatherstrip bodies) of a corner portion of the weatherstrip supported by the first and second weatherstrip holding sections can be reliably mounted by way of these holding sections to the both sides (the first and second holder portions) of a corner portion of the holder. Accordingly, deviation of the weatherstrip from its originally mounted position relative to the holder can be reliably prevented.

In the above preferred arrangement, the first and second weatherstrip holding sections are preferably made of hard resin. The first engaging portion of the first weatherstrip holding section is formed integrally with the first base member. The second engaging portion of the second weatherstrip holding section is formed integrally with the second base member.

With this arrangement, the base member and the engaging portion of each weatherstrip holding section can be made with a suitable degree of rigidity and to a coupled portion between them. Furthermore, each holding section can be easily manufacture precisely at low cost.

More preferably, the first holder portion has a first engaging portion having two engaging edges defining a recess which opens toward the weatherstrip. The second holder portion has a second engaging portion having two engaging edges defining a recess which opens toward the weatherstrip. The first engaging portion of the first weatherstrip holding section has two engaging piece members which are respectively formed at both side edges of the first base member of the first weatherstrip holding section integrally therewith. These engaging piece members are adapted to be engaged with the two engaging edges of the first holder portion, respectively. The second engaging portion of the second weatherstrip holding section has two engaging piece members which are respectively formed at both side edges of the second base member of the second weatherstrip holding section integrally therewith. These engaging piece members are adapted to be engaged with the two engaging edges of the second holder portion, respectively.

With this arrangement, the first and second weatherstrip holding sections can be positively and easily engaged with and disengaged from the first and second holder portions, respectively. Accordingly, attaching and detaching the weatherstrip to and from the holder can be done with improved efficiency. Further, a positive tactile response is provided when each weatherstrip holding section is engaged with and disengaged from the associated holder portion. Accordingly, a worker can easily judge whether the weatherstrip has been completely mounted to the holder and whether it has been dismounted therefrom.

More preferably, each engaging piece member of the first and second weatherstrip holding sections has a proximal end half having an oblique outer face thereof obliquely extending from a corresponding one of the first and second base members outward in a width direction of the base member, and has a distal end half having an outer face thereof formed with a stepped engaging-portion which is adapted to be engaged with a corresponding one of the engaging edges of the first and second holder portions.

With this arrangement, the weatherstrip holding section can be further easily and reliably engaged with and disengaged from the holder portion. Accordingly, the mounting and dismounting efficiency of the weatherstrip to and from the holder is further improved.

Preferably, the first base member of the first weatherstrip holding section is disposed on a side close to the first holder portion with respect to the first mounting base of the first weatherstrip body. The second base member of the second weatherstrip holding section is disposed on a side close to the second holder portion with respect to the second mounting base of the second weatherstrip body. The first weatherstrip holding section has a first holding member which is disposed on a side remote from the first holder portion with respect to the first mounting base and which is coupled to the first base member. The second weatherstrip holding section has a second holding member which is disposed on a side remote from the second holder portion with respect to the second mounting base and which is coupled to the second base member.

With this arrangement, the respective mounting bases of the first and second weatherstrip bodies can be reliably held between the base members and the holding members of the first and second weatherstrip holding sections. Accordingly, a deviation or slippage of the weatherstrip relative to the holder can be prevented and the efficiency of weatherstrip installation can be improved.

More preferably, the first holding member of the first weatherstrip holding section is disposed in a first recess which is formed in the first mounting base of the first weatherstrip body on a side remote from the first holder portion. The second holding member of the second weatherstrip holding section is disposed in a second recess which is formed in the second mounting base of the second weatherstrip body on a side remote from the second holder portion. The first weatherstrip holding section has a first coupling member extending through the first mounting base from the first base member toward the first holding member. The first holding member is formed with a first hole to which a distal end portion of the first coupling member is press-fitted. The second weatherstrip holding section has a second coupling member extending through the second mounting base from the second base member toward the second holding member. The second holding member is formed with a second hole to which a distal end portion of the second coupling member is press-fitted.

With this arrangement, the weatherstrip assembly can be assembled easily and accurately by disposing the first and second holding members of the first and second weatherstrip holding sections within the first and second recesses of the first and second weatherstrip bodies, and by press-fitting the first and second coupling members of the first and second weatherstrip holding sections into the first and second holes of the first and second holding members, respectively. Furthermore, the first and second coupling members respectively extending through the first and second mounting bases make it possible to positively prevent deviations of the first and second weatherstrip bodies in their installation positions relative to the first and second weatherstrip holding sections and the first and second holder portions.

DETAILED DESCRIPTION

A weatherstrip assembly according to an embodiment of the present invention, which is mounted to a door of a vehicle, will be described.

Figure 3:
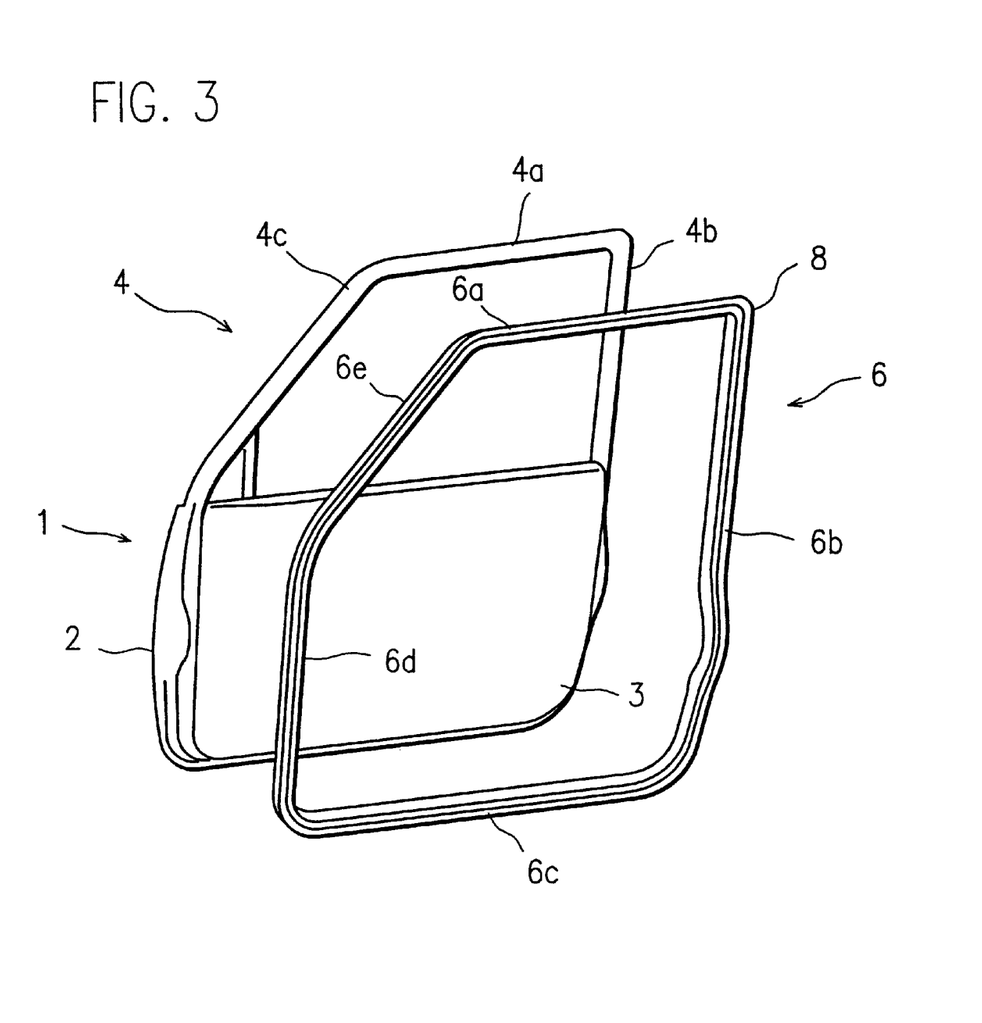
FIG. 3 is a schematic perspective view showing a weatherstrip, together with a door on which the weatherstrip is mounted.

In FIG. 3, reference numeral 1 designates a door which serves as an example of a movable body component and which is mounted to an aperture (refer to FIG. 8) formed in a body of an automobile. The door 1 generally includes a door outer panel 2 forming part of an outer panel of the body, a door inner panel 3 in/on which a doorlock, a window regulator, etc., (none of which is illustrated) are provided, and a door sash 4 for holding a window glass, not shown.

The door sash 4 has a first sash portion 4a forming an upper edge of the door 1, a second sash portion 4b forming an upper half of a rear edge of the door 1, and a third sash portion 4c forming an upper half of a front edge of the door 1. Respective lower ends of the second and third sash portions 4b, 4c are fixed to a rear upper coupled portion and a front upper coupled portion at which the door panels 2, 3 are connected with each other.

A holder 5 (FIG. 4) for weatherstrip installation is formed on the peripheries of the door inner panel 3 and the door sash 4. More specifically, the holder 5 includes a holder portion (its rear end portion is designated by reference numeral 51 in FIG. 4) formed on an outer face of the first sash portion 4a, and a holder portion (its upper end portion is designated by reference numeral 52 in FIG. 4) formed on outer faces of the second sash portion 4b and a rear edge of the door inner panel 3. The holder 5 further includes three holder portions formed on respective outer faces of a lower edge of the door inner panel 3, a front edge of the door inner panel 3, and the third sash portion 4c. Two adjacent holder portions (first and second holder portions) of the holder 5 form, at their adjacent end sections or corner-portion forming sections, an angle of approximately 90 degrees or an obtuse angle therebetween and form a corner portion of the holder 5. For example, the holder portions 51, 52 form an angle of approximately 90 degrees between them and form the both sides of the corner portion 53 of the holder 5. Each of the five holder portions has an outer face thereof provided with an engaging portion. The weatherstrip 6 is mounted to these engaging portions by way of weatherstrip holding section 9, 10 described later.

Figure 6:
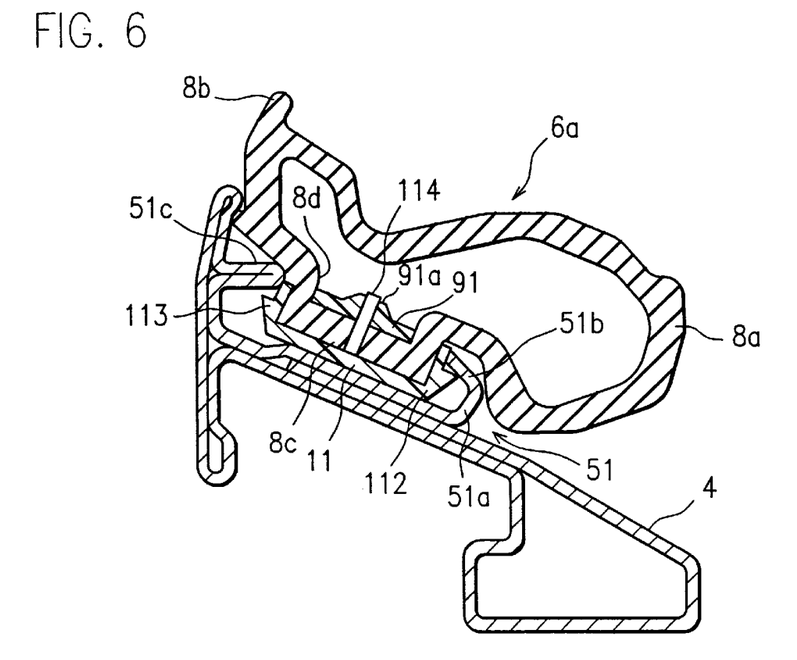
FIG. 6 is a cross-sectional view showing the weatherstrip assembly shown in FIG. 4 along line VI—VI of FIG. 4 in a state where the weatherstrip assembly is mounted to the door sash.
Figure 7:
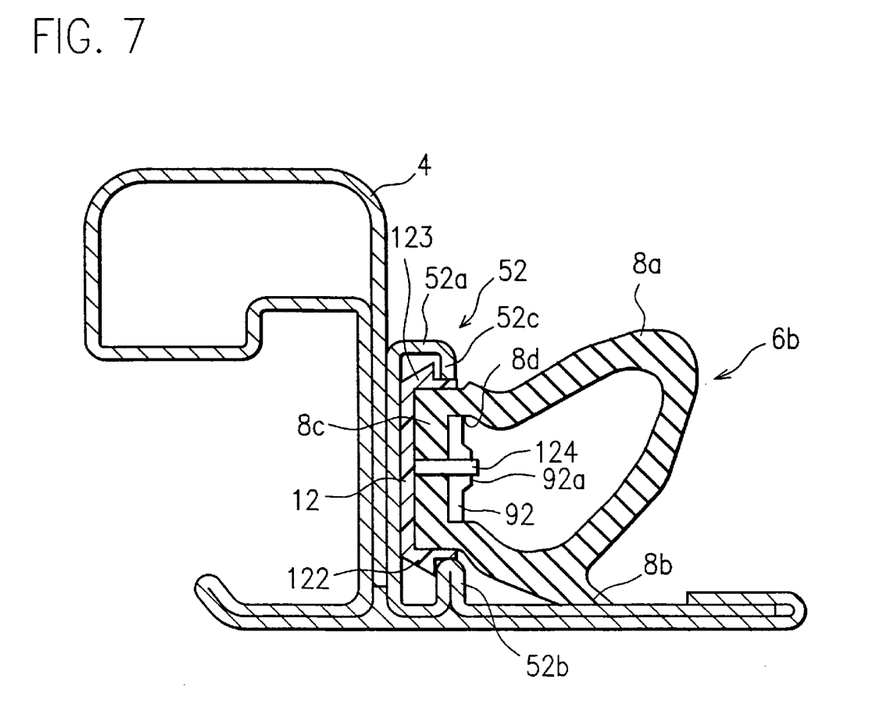
FIG. 7 is a cross-sectional view showing the weatherstrip assembly shown in FIG. 4 along line VII—VII of FIG. 4 in a state where the weatherstrip assembly is mounted to the door sash.

In FIG. 6, reference numeral 51a designates an engaging portion formed integrally with the holder portion 51 and formed into a C-shape in transversal cross section. The engaging portion 51a has two engaging edges 51b, 51c. The engaging portion 51a defines a recess which opens toward the weatherstrip and which receives a weatherstrip mounting base 8c. In FIG. 7, reference numeral 52a designates a similar engaging portion formed in the holder portion 52. The engaging portion 52a has engaging edges 52b, 52c and defines therein a recess.

The weatherstrip 6 is mounted to the periphery of the door 1 by way of the holders 5 so as to prevent wind, rain, etc. from entering the interior of the vehicle from clearances between the door 1 and the associated body aperture, and absorb a shock impact when opening and closing the door, and prevent vibrations of the door 1 during the running of the vehicle. The weatherstrip 6 in one part of the weatherstrip assembly, in cooperation with the weatherstrip holding section 9, 10.

As shown in FIG. 3, the weatherstrip 6 includes five weatherstrip bodies 6a to 6e, respectively, corresponding to the five holder portions of the holder 5. Two adjacent weatherstrip bodies (first and second weatherstrip bodies) among the five weatherstrip bodies constitute an associated one of five corner portions of the weatherstrip 6, respectively, corresponding to five corner portions of the holder 5.

In FIG. 3, reference numeral 8 designates a rear upper corner portion of the weatherstrip 6. This rear upper corner portion 8 is defined by a rear end portion of the weatherstrip body 6a mounted to the first sash portion 4a and an upper end portion of the weatherstrip body 6b mounted to the second sash portion 4b.

Figure 4:
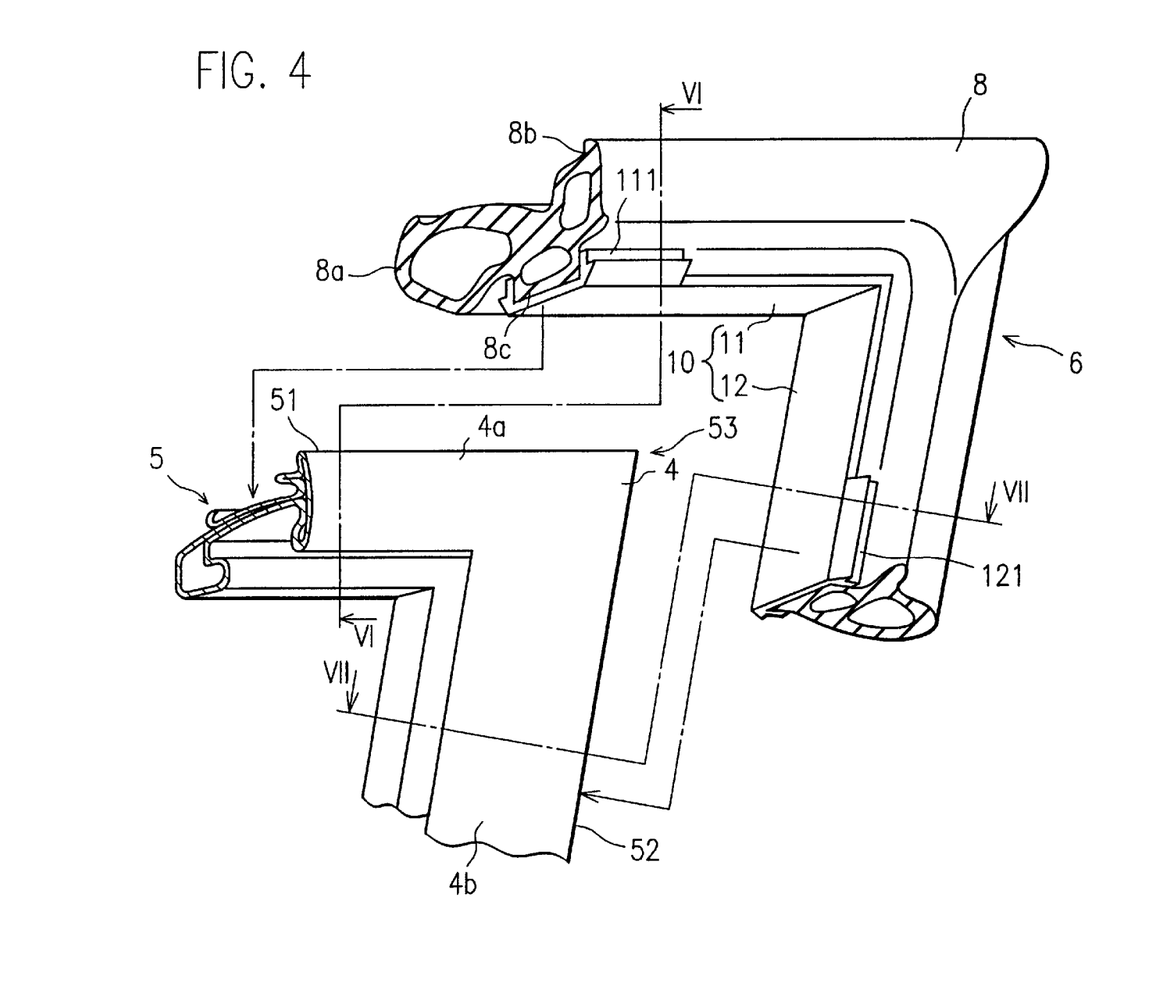
FIG. 4 is a fragmentary enlarged perspective view showing, partially broken, a corner portion of a weatherstrip assembly according to an embodiment of the present invention, including the weatherstrip of FIG. 3, together with a corner portion of a door sash on which the corner portion of the weatherstrip assembly is mounted.

Each weatherstrip bodies 6a to 6e of the includes a hollow seal portion, a lip portion, and a mounting base. Each weatherstrip body is adapted to be mounted at its mounting base to a corresponding one of the five holder portions of the holder 5. In FIG. 4, reference numerals 8a, 8b and 8c designate, respectively, the hollow seal portion, the lip portion and the mounting base of the rear upper corner portion 8 of the weatherstrip 6. The corner portion 8 is defined by corner-forming end portions of the weatherstrip bodies 6a, 6b.

Although illustrations are omitted herein, each of those straight portions of the weatherstrip bodies 6a and 6b, which are portions other than the corner-portion forming portions of the elements 6a and 6b, has a hollow seal portion, a lip portion, and a mounting base which are similar to 8a, 8b and 8c of the corner portion. Likewise, each of the weatherstrip bodies 6c, 6d and 6e other than the weatherstrip bodies 6a, 6b has elements similar to the elements 8a, 8b and 8c.

The straight portions of the weatherstrip bodies are obtainable, e.g., by extrusion molding of sponge rubber. As for the mounting bases, on the other hand, the corner portion and the remaining portion of each mounting base are made of non-foamable solid rubber and sponge rubber, respectively, for instance. The corner portions of the weatherstrip 6 are formed integrally with the associated straight portions by means of injection vulcanization molding.

The weatherstrip holding section used to mount the weatherstrip bodies to the holder portions has five retainers 9 each fixed to the inner face of the associated weatherstrip body at locations corresponding to respective corner portions 8 of the weatherstrip 6, and has five clips 10 each fixed to the outer face of the associated weatherstrip body at locations located at the corresponding corner portion 8. Each retainer 9 and each clip 10 are formed into an L-shape or a V-shape suited to a corresponding one L-shaped or V-shaped weatherstrip corner portion 8.

The retainer 9 and the corresponding clip 10 are connected to each other by means of coupling pins (designated by reference numerals 114, 124 in FIG. 5) which project from the clip 10 toward the retainer 9, respectively, with the associated weatherstrip body held between the elements 9 and 10.

Figure 5:
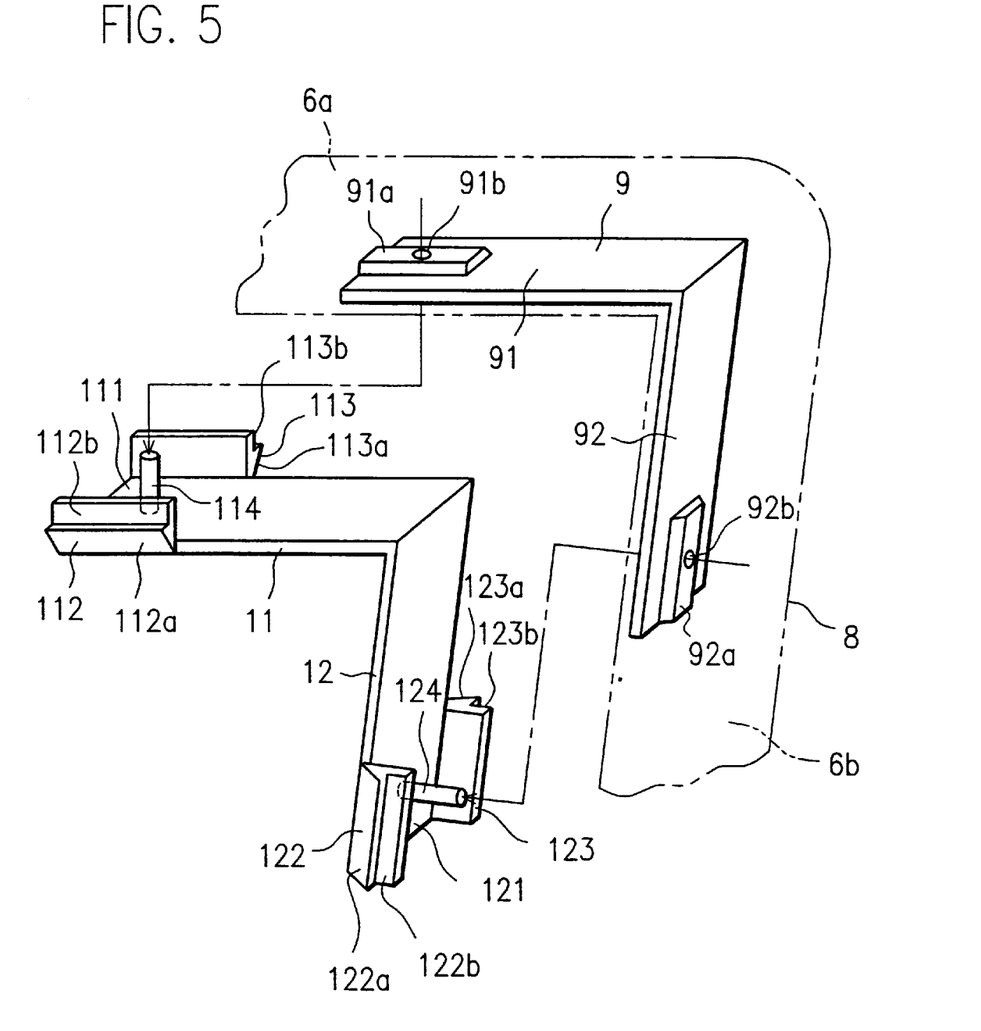
FIG. 5 is a enlarged fragmentary perspective view showing a retainer and a clip which cooperate to constitute the weatherstrip assembly as partially shown in FIG. 4.

As shown in FIG. 5, the retainer 9 mounted at the corner portion 8 has a first second retainer portions (first and second holding members) 91 and 92 respectively corresponding to the two weatherstrip bodies 6a, 6b which cooperate to form the corner portion 8. These retainer portions 91 and 92 are formed integrally with each other. The retainer portions 91, 92 are preferably obtained by a molding technique using hard resin as a molding material. The first retainer portion 91 has an outer end portion thereof formed at its inner face with a thick portion 91a which is in turn formed at its central portion with a pin inserting hole (a first hole) 91b extending through the thick portion 91a. The pin inserting hole 91b has a diameter slightly smaller than the outer diameter of the coupling pin (a first coupling member) 114. Similarly, the second retainer portion 92 has a thick portion 92a in which a pin inserting hole (a second hole) 92b having a diameter slightly smaller than the outer diameter of the coupling pin (a second coupling member) 124 is formed. Each of the other retainers has a similar construction although illustrations thereof are omitted to avoid repetition.

As shown in FIGS. 4 and 5, the clip 10 mounted to the corner portion 8, among the five clips, has a first and second clip portions 11 and 12 respectively corresponding to the two weatherstrip bodies 6a, 6b which cooperate to form the corner portion 8. The first clip portion 11 constitutes a first weatherstrip holding section in cooperation with the first retainer portion 91. The second clip portion 12 constitutes a second weatherstrip holding section in cooperation with the second retainer portion 92.

The first and second clip portions 11 and 12 are preferably formed integrally with each other by a molding technique using hard resin as a molding material. The first clip portion 11 has a base member 111 fixed to the mounting base 8c of the associated weatherstrip and also has an engaging portion adapted to be engaged with the associated holder portion. Similarly, the second clip portion 12 has a base member 121 and an engaging portion.

The engaging portion of the first clip portion 11 has two engaging piece members 112, 113 which are integrally formed at both side edges of the base member 111 and which are disposed to face to each other. The engaging piece member 112 has a proximal end half having an oblique outer face 112a thereof obliquely extending from the base member 111 outward in the width direction of the base member, and also has a distal end half having an outer face thereof formed with a stepped engaging-portion 112b which is adapted to be engaged with an engaging edge 51b (FIG. 6) of the holder portion 51. Similarly, the other engaging piece member 113 has an oblique outer face 113a and a stepped engaging-portion 113b. The distance between the stepped engaging-portion 112b and engaging-portion 113b is slightly longer than the distance between the engaging edges 51b and 51c of the holder portion 51.

As in the case of the first clip portion 11, the second clip portion 12 is integrally formed at opposite side edges of the base member 121 with engaging piece members 122, 123 which have oblique outer faces 122a, 123a and stepped engaging-portions 122b, 123b, respectively. These engaging piece members 122 and 123 form the engaging portion of the second clip portion 12.

In the above explanation, the weatherstrip assembly is mainly explained in association with the rear upper corner portion of the weatherstrip 6 defined by the first and second weatherstrip bodies 4a and 4b. The other four corner portions of the weatherstrip 6 are constructed in a similar manner.

The following is a description of a manner of assembling the weatherstrip assembly having the aforementioned construction.

At each of the five corner portions (see FIG. 3) of the weatherstrip 6, the retainer 9 is press-fitted into the recess 8d of the mounting base 8c of the weatherstrip, to thereby mount the retainer 9 on the inner face of the mounting base 8c. Next, the clip 10 is mounted to the outer face of the mounting base 8c of the weatherstrip 6 in a state where the coupling pins 114, 124 formed in the clip 10 are respectively aligned with the pin holes 91b, 92b of the retainer 9 and associated pin holes formed in the weatherstrip mounting base 8c in alignment with the pin holes 91b, 92b. The coupling pins 114, 124 are press-fitted into these pin holes of the weatherstrip mounting base 8c and the pin holes 91b, 92b of the retainer 9, so that the mounting base 8c is held between the retainer 9 and the clip 10. Namely, the retainer 9 and the clip 10 are fixed to the inner and outer faces of the mounting base 8c, respectively. Thus, the weatherstrip mounting base 8c, the retainer 9 and the clip 10 are integrally coupled to one another, whereby the assemblage of the weatherstrip assembly is completed.

In the following, a manner of mounting the thus assembled weatherstrip assembly to the holder 5 will be explained.

A worker grips the weatherstrip assembly and causes the clip 10 of the weatherstrip assembly to be engaged with the holder 5. More specifically, as shown in FIG. 6, the worker inserts the mounting bases 8c of the weatherstrip 6 and the clips 10 mounted into the corresponding recesses formed in the engaging portions 51a, 52a of the holder 5, respectively, so that the stepped engaging-portions 112b, 113b; 122b, 123b formed in the outer faces of respective distal end halves of the engaging piece members 112, 113; 122, 123 of each clip 10 are engaged with associated engaging edges 51b, 51c; 52b, 52c of the holder 5. At this time, the engaging work can be easily carried out since the outer faces 112a, 113a; 122a, 123a of proximal end halves of the engaging piece members are inclined outwardly.

According to the weatherstrip assembly having the weatherstrip 6 held between the clips 10 and the retainers 9 which are made of hard resin and have a suitable rigidity, the engaging work, i.e., the weatherstrip installation work, can be made efficiently, since the worker can make the work while grasping a hollow seal portion 8a or a lip portion 8b of the weatherstrip 6.

For similar reasons, a detachment work for dismounting the weatherstrip assembly from the holder 5 can be also made efficiently, e.g., at the time of weatherstrip assembly replacement.

During the process of engaging the clips 10 with the holder 5, the engaging piece members 112, 113; 122, 123 of the clips 10 and the weatherstrip mounting bases 8c are slightly deformed inwardly in the width direction of the clip because the distance between each engaging piece member pair is slightly greater than that between the associated engaging edges 51b, 51c; 52b, 52c of the holder. If the engaging piece members 112, 113; 122, 123 have been once engaged with the holder opening edges 51b, 51c; 52b, 52c, each engaging piece member tends to be restored from a deformed state established during the engagement, so that a force is generated which exerts outwardly in the clip width direction, i.e., toward the engaging edge of the holder. This restoration force of the engaging piece member cooperates with a similar force caused by the weatherstrip mounting base 8c which tends to be restored from its deformed state to permit the weatherstrip 6 to be reliably held by the holder 5 through the clips 10. As a result, each corner portion of the weatherstrip 6 is reliably mounted to the corresponding corner portion of the holder 5.

A positive tactile response is produced when each pair of the engaging piece members of the clips are engaged with the associated engaging edges of the holder. Accordingly, a worker can assuredly confirm whether or not the clips 10 have been positively mounted to the holder 5. Therefore, a faulty installation can be prevented.

At each corner portion of the weatherstrip 6, the weatherstrip mounting base 8c is held between the retainer 9 and the clip 10. Especially, movement of the weatherstrip 6 is prevented by the coupling pins 114, 124 which extend through the weatherstrip mounting base 8c from the clip 10 to the retainer 9. Accordingly, deviation of the weatherstrip from its installation position relative to the holder 5 barely occurs, if at all even if a worker pulls the weatherstrip 6 when mounting the weatherstrip assembly to the holder 5.

The present invention is not limited to the foregoing embodiment, but may be modified in various manners.

For example, in the embodiment, each clip 10 is fixed to the weatherstrip mounting base 8c associated therewith by holding the weatherstrip 6 between the retainer 9 and the clip 10. However, the clips 10 may be directly adhered to the weatherstrip mounting bases 8c using an adhesive, etc.

In the embodiment, each retainer 9 comprised of two retainer portions 91, 92 is formed into one piece and is, as a whole, formed into an L-shape or a V-shape. However, it is not essentially required to form these two retainer portions into one piece. Moreover, it is not essential to form the retainer 9 by the two retainer portions. For example, the retainer may be formed into a plate-shape and may have approximately the same length as that of the thick portion 91a shown in FIG. 5. In the case of applying a weatherstrip assembly having such a plate-shaped retainer to a front door, the retainer is so arranged as to affect an upper-side door sash. When the weatherstrip assembly of this type is applied to a rear door, the retainer is arranged to affect a front-side door sash.

In the embodiment, the clip 10 comprised of the two clip portions 11, 12 is formed into one piece to have an L-shape or a V-shape, as a whole. However, it is not essential to form these clip portions into one piece. Also, it is not essential to construct the clip 10 by the two clip portions. For example, the clip may be formed to have approximately the same length as those of the engaging piece members 112, 113; 122, 123 shown in FIG. 5. Such clips are applicable to two weatherstrip bodies which constitute both sides of a corner portion of the weatherstrip.

Figure 8:
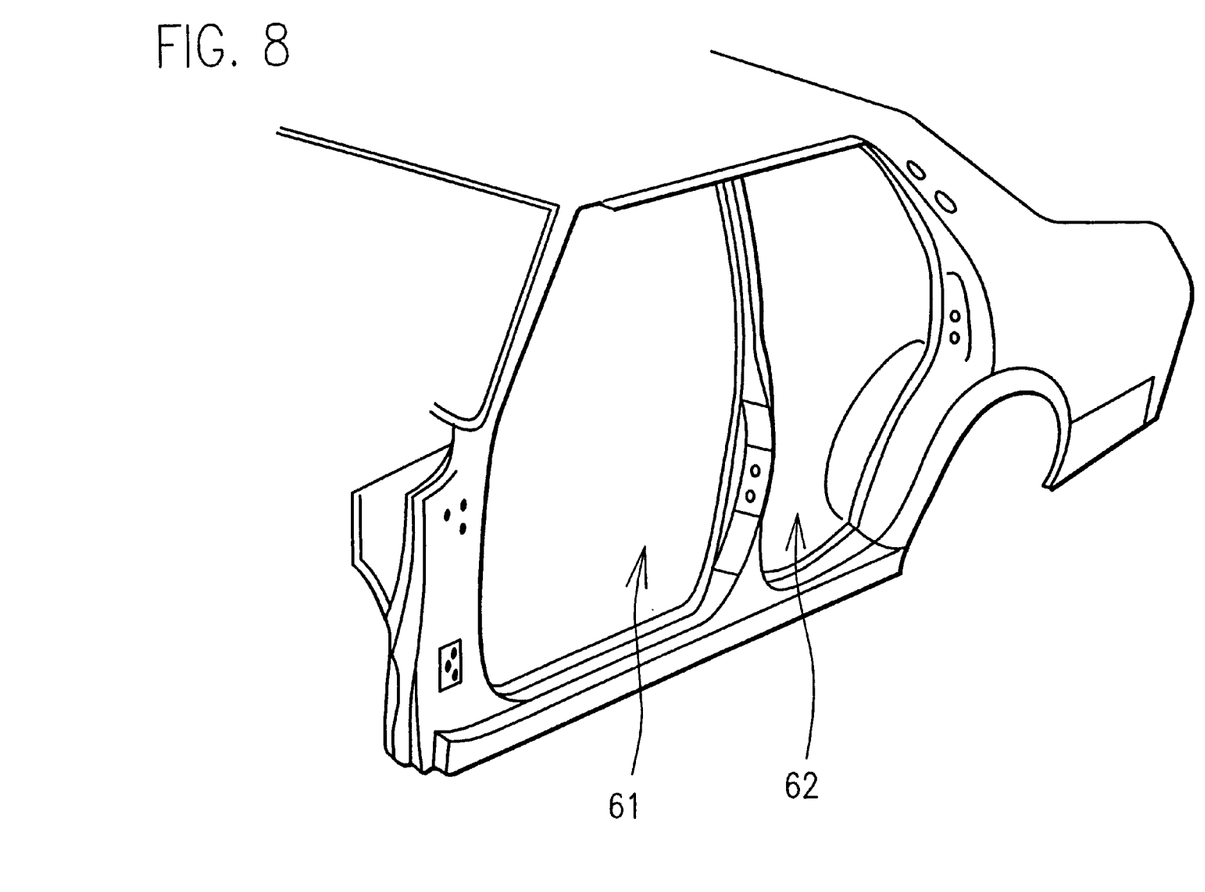
FIG. 8 is a fragmentary perspective view showing, by way of example, a body aperture to which a weatherstrip assembly of the present invention can be mounted.

In the embodiment, the present invention has been explained for the case where it is applied to a door of an automobile. However, the weatherstrip assembly of the present invention is also applicable to a movable body component other than a door, such as a front hood, a trunk lid, etc., and is also applicable to body apertures for body components such as a door, a front hood, a trunk lid, etc. In FIG. 8, two body apertures for doors are designated by reference numerals 61, 62.

Moreover, various features of the embodiment and the above-mentioned modifications may be combined variously.

What is claimed is:

1. A weatherstrip assembly adapted to be mounted on a body component, the body component being provided with a first holder portion and a second holder portion arranged at an angle of approximately 90° relative to the first holder portion, the weatherstrip assembly comprising:

a weatherstrip comprising first and second weatherstrip bodies which have first and second mounting bases, respectively;

a first weatherstrip holding section fixed to said first mounting base and constructed and arranged to be engageable with the first holder portion;

a second weatherstrip holding section fixed to said second mounting base and constructed and arranged to be engageable with the second holder portion;

wherein said first and second weatherstrip bodies and said first and second weatherstrip holding sections are arranged at an angle of approximately 90° relative to each other;

wherein said first weatherstrip holding section has a first base member fixed to said first mounting base, and a first engaging portion constructed and arranged to be engageable with the first holder portion;

wherein said second weatherstrip holding section has a second base member fixed to said second mounting base, and a second engaging portion constructed and arranged to be engageable with the second holder portion;

said first and second base members being formed integrally with each other and forming substantially the same angle therebetween as the angle formed between the first and second holder portions;

wherein;

said first and second weatherstrip holding sections are made of resin;

said first engaging portion is formed integrally with said first base member; and said second engaging portion is formed integrally with said second base member.

2. The weatherstrip assembly according to claim 1, wherein:

the first holder portion has a first engaging portion having two engaging edges and defines a recess which opens toward said weatherstrip;

the second holder portion has a second engaging portion having two engaging edges and defines a recess which opens toward said weatherstrip;

said first engaging portion of said first weatherstrip holding section has two engaging piece members which are respectively formed at both side edges of said first base member of said first weatherstrip holding section and are integral therewith, said two engaging piece members being constructed and arranged to be engageable with the two engaging edges of the first holder portion, respectively;

said second engaging portion of said second weatherstrip holding section has two engaging piece members which are respectively formed at both side edges of said second base member of said second weatherstrip holding section and are integral therewith, said two engaging piece members being constructed and arranged to be engageable with the two engaging edges of the second holder portion, respectively.

3. The weatherstrip assembly according to claim 2, wherein:

each said engaging piece member of said first weatherstrip holding section has a proximal end half having an oblique outer face extending obliquely from a corresponding one of said first base member outwardly in a width direction of said first base member, and has a distal end half having an outer face formed with a stepped engaging-portion which is adapted to be engaged with a corresponding one of the engaging edges of the first holder portion each said engaging piece member of said second weatherstrip holding section has a proximal end half having an oblique outer face extending obliquely from a corresponding one of said second base member outwardly in a width direction of said second base member, and has a distal end half having an outer face formed with a stepped engaging-portion which is adapted to be engaged with a corresponding one of the engaging edges of the second holder portion.

4. A weatherstrip assembly adapted to be mounted on a body component, the body component being provided with a first holder portion and a second holder portion arranged at an angle of approximately 90° relative to the first holder portion, the weatherstrip assembly comprising:

a weatherstrip comprising first and second weatherstrip bodies which have first and second mounting bases, respectively;

a first weatherstrip holding section fixed to said first mounting base and constructed and arranged to be engageable with the first holder portion;

a second weatherstrip holding section fixed to said second mounting base and constructed and arranged to be engageable with the second holder portion;

wherein said first and second weatherstrip bodies and said first and second weatherstrip holding sections are arranged at an angle of approximately 90° relative to each other;

wherein said first weatherstrip holding section has a first base member fixed to said first mounting base, and a first engaging portion constructed and arranged to be engageable with the first holder portion;

wherein said second weatherstrip holding section has a second base member fixed to said second mounting base, and a second engaging portion constructed and arranged to be engageable with the second holder portion;

said first and second base members being formed integrally with each other and forming substantially the same angle therebetween as the angle formed between the first and second holder portions;

wherein said first base member of said first weatherstrip holding section is disposed on an exterior side of said first mounting base of said first weatherstrip body;

wherein said second base member of said second weatherstrip holding section is disposed on an exterior side of said second mounting base of said second weatherstrip body;

wherein said first weatherstrip holding section has a first holding member which is disposed on an interior side of said first mounting base and which is coupled to said first base member;

wherein said second weatherstrip holding section has a second holding member which is disposed on an interior side of said second mounting base and which is coupled to said second base member;

wherein;

said first holding member of said first weatherstrip holding section is disposed in a first recess which is formed in an interior side of said first mounting base of said first weatherstrip body;

said second holding member of said second weatherstrip holding section is disposed in a second recess which is formed in an interior side of said second mounting base of said second weatherstrip body;

said first weatherstrip holding section has a first coupling member extending through said first mounting base from said first base member toward said first holding member;

said first holding member includes a first hole in which a distal end portion of said first coupling member is press-fitted;

said second weatherstrip holding section has a second coupling member extending through said second mounting base from said second base member toward said second holding member; and said second holding member includes a second hole in which a distal end portion of said second coupling member is press-fitted.

5. A weatherstrip assembly adapted to be mounted on a mounting surface provided with first and second holder portions, the weatherstrip assembly comprising:

a weatherstrip including contiguous first and second weatherstrip bodies;

a retainer section disposed within said weatherstrip and comprising a first clip portion disposed within said first weatherstrip portion and a second clip portion disposed within said second weatherstrip portion;

a weatherstrip holding section fixed relative to said retainer section on an exterior side of said weatherstrip, thereby holding a portion of said weatherstrip therebetween, said weatherstrip holding section including first and second engaging members located in correspondence with first and second weatherstrip portions, respectively, wherein said first and second engaging members are constructed and arranged to be engagable with the first and second holder portions so as to mount the weatherstrip assembly on the mounting surface.

6. The assembly according to claim 5, wherein said first and second weatherstrip bodies are aligned at an angle relative to one another.

7. The assembly according to claim 6, wherein said first and second weatherstrip bodies are aligned at substantially a right angle relative to one another.

8. The assembly according to claim 5, wherein one of said retainer section and said weatherstrip holding section includes a pin member and the other of said retainer section and said weatherstrip holding section includes a pin hole for receiving said pin member in a press-fit manner through an opening in the weatherstrip, thereby fixing together said retainer section and said weatherstrip holding section.

9. The assembly according to claim 8, wherein said retainer section includes a pin member and said weatherstrip holding section includes a pin hole for receiving said pin member in a press-fit manner through an opening in the weatherstrip, thereby fixing together said retainer section and said weatherstrip holding section.

10. The assembly according to claim 5, wherein said first and second engaging members include a first portion extending obliquely and laterally outward, and a second laterally inwardly extending stepped portion.

11. The assembly according to claim 10, wherein said first and second engaging members are provided on said first weatherstrip holding section.

12. The assembly according to claim 5, wherein said first and second weatherstrip holding sections are each made from a molded resin material.

* * * * *